United States Patent [19]

Takahashi

[11] Patent Number: 5,031,100
[45] Date of Patent: Jul. 9, 1991

[54] SHIFT CONTROL SYSTEM FOR AUTOMATIC TRANSMISSION

[75] Inventor: Hiroshi Takahashi, Zushi, Japan

[73] Assignee: Nissan Motor Co., Ltd., Yokohama, Japan

[21] Appl. No.: 361,902

[22] Filed: Jun. 5, 1989

[30] Foreign Application Priority Data

Jun. 17, 1988 [JP] Japan .................. 63-149496

[51] Int. Cl.⁵ .................. B60K 41/18; G05D 17/02
[52] U.S. Cl. .................. 364/424.1; 74/866
[58] Field of Search .................. 364/424.1; 74/866; 381/42

[56] References Cited

U.S. PATENT DOCUMENTS

| 4,523,281 | 6/1985 | Noda et al. | 364/424.1 |
| 4,584,906 | 4/1986 | Nagaoka et al. | 74/866 |
| 4,742,733 | 5/1988 | Schreiner | 74/866 |
| 4,862,363 | 8/1989 | Krisher et al. | 364/424.1 |
| 4,889,015 | 12/1989 | Kondo | 74/866 |
| 4,897,790 | 1/1990 | Bieber | 364/424.1 |

FOREIGN PATENT DOCUMENTS

59-200849 11/1984 Japan .
61-124759 6/1986 Japan .

Primary Examiner—Felix D. Gruber
Attorney, Agent, or Firm—Foley & Lardner

[57] ABSTRACT

A shift control system for an automatic transmission of a vehicle includes a vehicle speed sensor, a throttle opening sensor, and a controller which determines a desired speed ratio in accordance with the vehicle speed and throttle opening by using a shift pattern, and controls the automatic transmission to achieve the desired speed ratio. There are further provided an input device which permits the driver to appraise the shifting performance, and to produce a complaint signal against each unsatisfying shift, and a modifying means for altering the shift pattern in accordance with the driver's complaint.

16 Claims, 5 Drawing Sheets

FIG.5 ary tests is still unsatisfactory to each

SHIFT CONTROL SYSTEM FOR AUTOMATIC TRANSMISSION

BACKGROUND OF THE INVENTION

The present invention relates to a shift control system for an automatic transmission of a vehicle which is capable of changing its shift characteristics to suit driver's taste.

There have been proposed many electronically controlled automatic transmissions which are arranged to select one of numerous predetermined shift tables in accordance with driver's intention or automatic recognition of driving conditions (Japanese Patent Provisional Publications Nos. 61-124759 and 59-200849, for example). In general, the shift tables are two-dimensional maps using vehicle speed and throttle opening as parameters.

However, these shift tables are fixedly determined so as to suit an imaginary typical driver by the manufacturing process without any participation of each individual user. Therefore, driving habits and peculiar environment of each individual driver are not taken into consideration, and the shifting is still unsatisfactory to each individual driver.

SUMMARY OF THE INVENTION

It is therefore an object of the present invention to provide a shift control system for a vehicle automatic transmission which is capable of altering its shift characteristics in accordance with driver's preference.

According to the present invention, a shift control system for an automatic transmission of a vehicle comprises an actuator means, a sensor means, a controller means, an input means and a modifying means. The actuator means is a means for actually changing a speed ratio of the automatic transmission in response to a shift control signal produced by the controller means. The sensor means is a means for sensing at least one operating condition of the vehicle, and producing at least one sensor signal representing the sensed condition. The controller means is connected with the sensor means to receive the sensor signal, and arranged to produce the shift control signal to control the automatic transmission in accordance with an adaptable shift pattern. The input means is a means which permits a driver of the vehicle to evaluate a shift effected by the controller means through the actuator means, and to produce a driver's evaluation signal. The modifying means is a means for altering the shift pattern in accordance with the evaluation signal.

DETAILED DESCRIPTION OF THE INVENTION

One embodiment of the present invention is shown in FIGS. 1-5.

Figure 5:
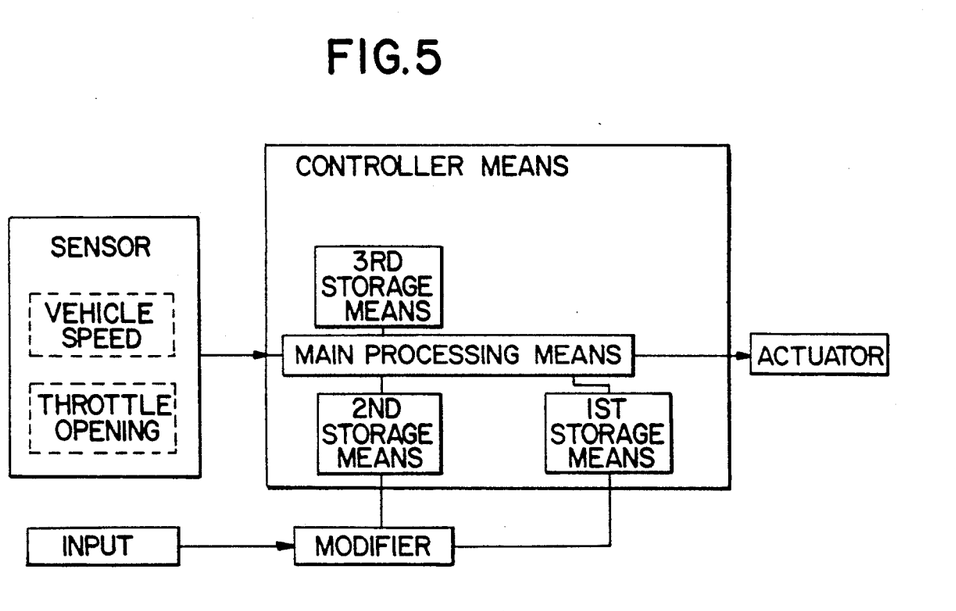
FIG. 5 is a block diagram for schematically illustrating basic features of the shift control system of the embodiment.

FIG. 5 schematically shows basic elements of a shift control system of the embodiment, which are an actuator means for changing a speed ratio of an automatic transmission in response to a shift control signal, a sensor means for sensing one or more vehicle operating conditions such as vehicle speed and throttle opening, a controller means for producing the shift control signal in accordance with the vehicle operating conditions by using a predetermined shift pattern which may be stored in a storage means, an input means permitting a driver of the vehicle to evaluate a shift performed by said controller means through the actuator means and to produce an evaluation signal, and a modifier (or modifying) means for altering the shift pattern in accordance with the evaluation signal. In the example shown in FIG. 5, the controller means comprises a first storage means for storing data defining at least one shift line of an adaptable (individual) shift pattern, a second storage means for storing values of the vehicle operating conditions, a third (read-only) storage means for storing a basic shift pattern, and a main processing (processor) means for producing the shift control signal in accordance with one of the adaptable shift pattern and basic shift pattern.

Figure 1:
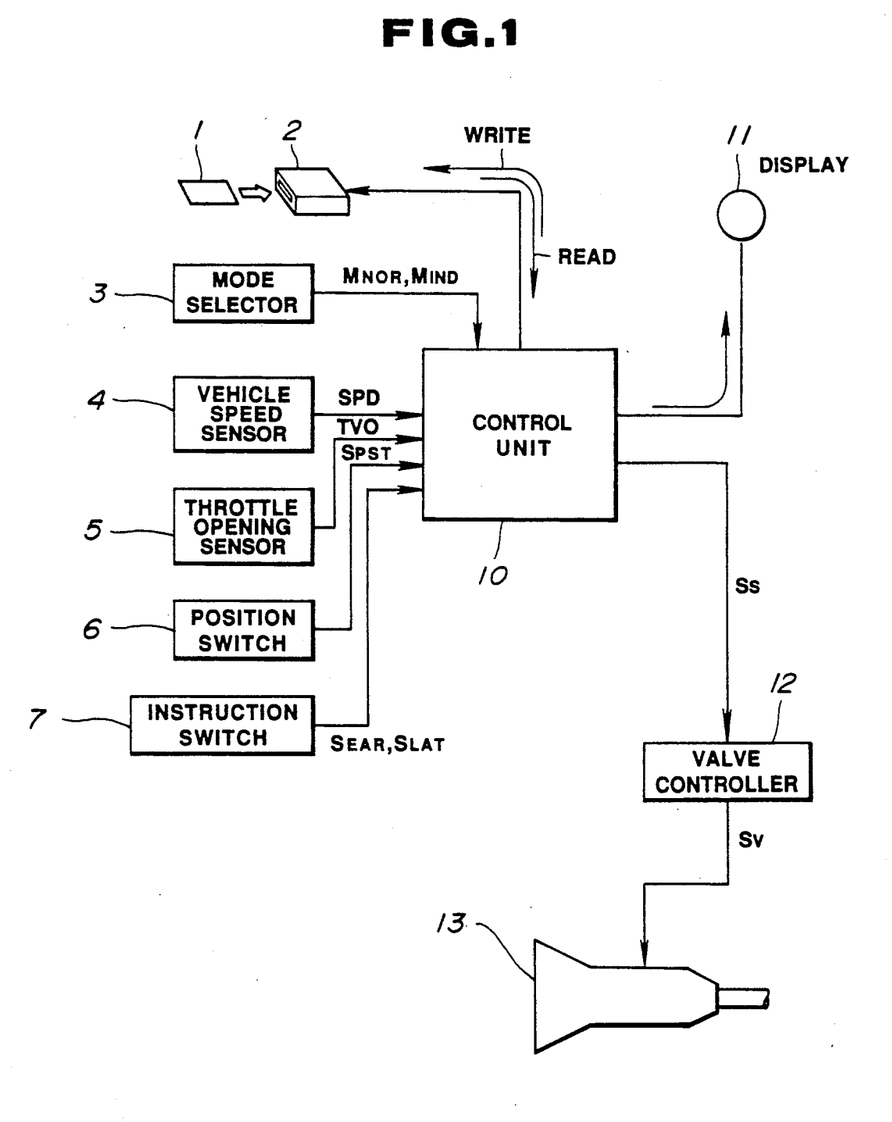
FIG. 1 is a schematic view of a shift control system according to one embodiment of the present invention.

FIG. 1 shows the shift control system of the embodiment more concretely.

As shown in FIG. 1, the control system includes a portable storage medium 1, such as an IC memory card, for storing at least one shift pattern, and a drive unit 2 for reading data from the IC card 1, writing data into the IC card 1 and deleting data in the IC card 1. The storage medium 1 is a read/write memory. The drive unit 2 is mounted on the vehicle, and has a slot into which the IC card 1 is to be inserted.

The control system further includes a mode selector switch 3 mounted on the vehicle near the driver's seat. The mode selector switch 3 has a normal mode position for producing a normal mode signal Mnor and an individual mode position for producing an individual mode signal Mind. The driver of the vehicle can select one of the normal mode and the individual mode by operating the selector switch 3.

A sensor group of the control system includes a vehicle speed sensor 4 for sensing a vehicle speed SPD, and a throttle opening sensor 5 connected with an accelerator pedal for sensing a throttle opening TVO of an engine of the vehicle. The vehicle speed sensor 4 and the throttle opening sensor 5 serve as the sensor means.

A position switch 6 is a switch for sensing the condition of the automatic transmission, and includes an inhibitor switch for sensing the position of a control lever of the automatic transmission (1, 2, D, N, R and P positions), and an overdrive (OD) switch. The position switch 6 produces a position signal Spst representing the selection from the 1, 2, D, N, R, P and OD positions.

An instruction switch 7 serves as the input means. The instruction switch 7 is installed in the vehicle near the driver's seat. The instruction switch 7 has at least a first position for producing a first evaluation signal Sear representing a driver's evaluation that the shift is too early, and a second position for producing a second evaluation signal Slat representing a driver's evaluation that the shift is too late. The driver can determine whether the most recently performed automatic shift of the automatic transmission is too early or too late, or appropriate, and produce one of the first and second evaluation signals by operating the instruction switch 7. The instruction switch 7 may be a toggle switch having two contacts, a touch switch, a pushbutton switch, a self-reset type rotary switch, or a voice recognition input device.

A control unit 10 of this embodiment is composed of a microcomputer including ROM, RAM, I/O section, and CPU. The ROM stores a fixed shift diagram (or a basic shift pattern), a shift control program, and a software for performing a learning algorithm of perceptron (mentioned hereinafter). The RAM includes various working areas, and areas reserved for storing at least one shift pattern.

The CPU of the control unit 10 selects between a normal shift control mode based on a basic shift pattern and an individual shift control mode based on an individual shift pattern, in accordance with the output signal of the mode selector switch 3, and performs the shift control according to the selected mode. Moreover, the CPU is designed to adapt the individual shift pattern to driver's preference by modifying data of the individual shift pattern, and to write the modified individual shift pattern to the IC card 1 by sending the modified data to the drive unit 2.

A display 11 is connected with the control unit 10. The control unit 10 sends a display signal to the display 11 and shows information to the driver. When the mode selector switch 3 is at the individual mode position, and yet the IC card 1 is not in the drive unit 2, then the display 11 sends a message to request the driver to set the IC card 1. By performing the shift control procedure of the normal or individual mode, the control unit 10 produces a shift control signal Ss and sends this signal Ss to a valve controller 12. In accordance with the shift control signal Ss, the valve controller 12 sends a valve actuator signal Sv to an automatic transmission 13 to obtain a desired speed ratio represented by the shift control signal. In this embodiment, the transmission 13 is a four-speed transmission having overdrive.

The before-mentioned perceptron is known as one category of neuro-computing likened to a growing nervous network, and designed to learn classification of input patterns under instructions of a teacher by modifying a nervous net of the perceptron structure according to a learning algorithm of the perceptron. When, for instance, the goal of learning is a perceptron structure which yields an output from its output layer only in the case of a desired input pattern being applied to its input layer, a learning operation caused by application of a teacher's signal responsive to the desired pattern is repeated until the algorithm is so constructed as to provide an output suited to the teacher's intention.

The present invention is based on such a perceptron theory. In this invention, the input pattern is data representing vehicle operating conditions (such as vehicle speed and throttle opening) obtained at an actual shift operation of the automatic transmission, the teacher is the driver, and the nervous network is a shift characteristics growing in a desired direction by learning.

Figure 2:
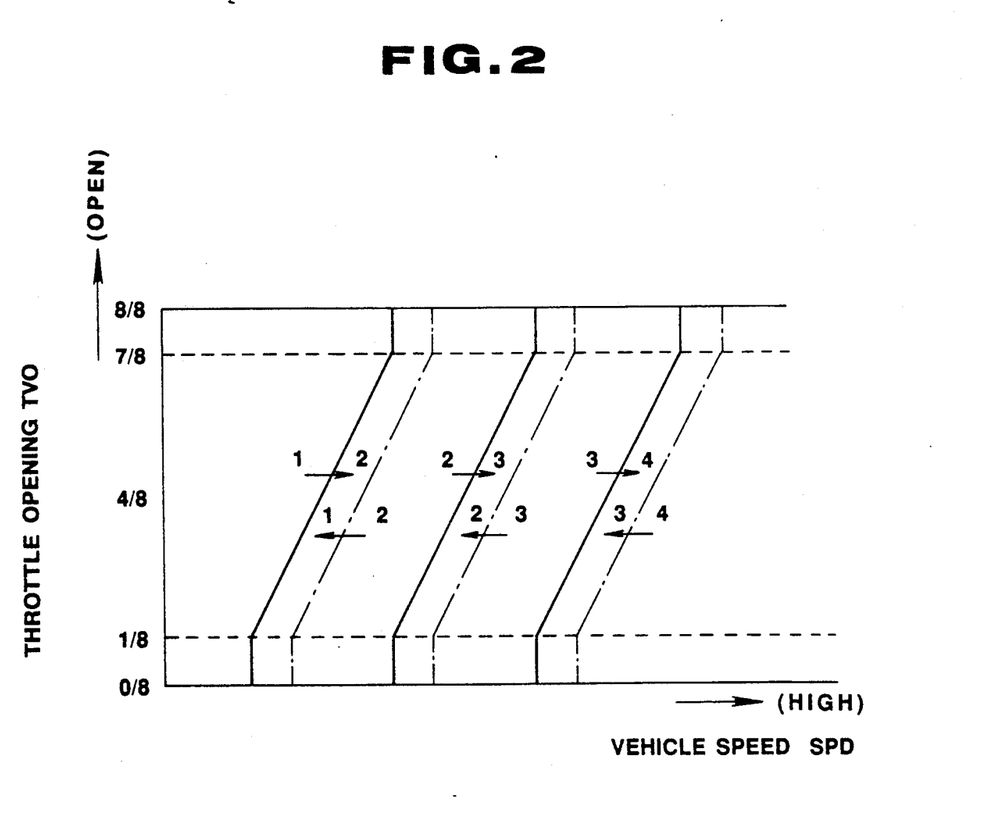
FIG. 2 is a diagram showing a shift pattern used in the embodiment.

FIG. 2 shows the basic shift pattern. At first, the individual shift pattern is set equal to the basic shift pattern shown in FIG. 2. As the modification proceeds, the individual shift pattern deviates from the basic pattern.

The shift pattern shown in FIG. 2 is a two dimensional map representing relationships between the throttle opening TVO and the vehicle speed SPD. The shift pattern of this embodiment has first, second, third and fourth speed zones, and the desired speed ratio of the transmission 13 is determined by the location of a position specified by a set of current values of TVO and SPD. Boundary lines between neighboring speed zones are called shift lines. The operating point specified by the set of the current values of TVO and SPD moves in the map as TVO and SPD vary. When the operating point crosses one of the shift lines, then the shift control system performs the shift from the speed ratio on one side of the shift line to the ratio on the other side. In the example of FIG. 2, each shift line consists of an upshift line and a downshift line.

The control system of this embodiment is arranged to adapt the individual shift pattern to the driver's preference by modifying the shift lines. In this embodiment, the individual shift pattern is stored in the IC card 1. Therefore, each individual driver can have his own IC card storing his shift pattern, and easily obtain a well-suited shift performance by setting his IC card into the drive unit 2 even if the car is used by two or more drivers. When two or more cars are available, a driver can use his IC card in any of the cars as long as they are equipped with the shift control system of this embodiment.

Figure 3:
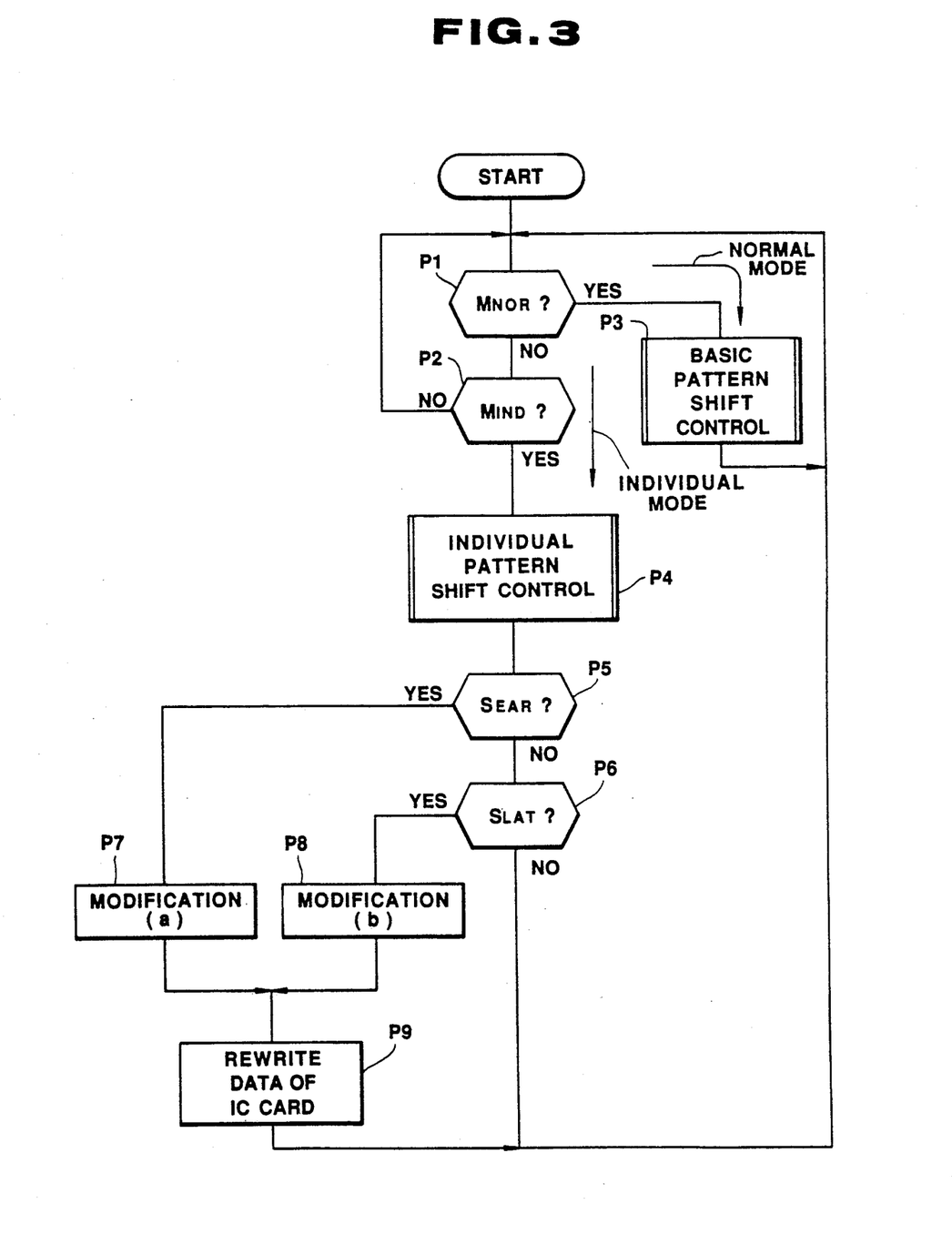
FIG. 3 is a flowchart of a control procedure employed in the embodiment.

FIG. 3 shows the shift control procedure of the embodiment.

At steps P1 and P2, the control unit 10 selects the shift control mode by checking the output signal of the mode selector switch 3. That is, the control unit 10 determines, at the step P1, whether the normal mode signal Mnor is present or not. At the step P2, the control unit 10 determines whether the individual mode signal Mind is present. If the selector switch 3 is at the normal mode position and the normal mode signal Mnor is present, then the control unit 10 proceeds from the step P1 to a step P3. If the individual mode signal Mind is present, then the control unit 10 proceeds to a step P4. At the step P3, the control unit 10 performs the normal shift control by using the fixed basic shift pattern stored in the ROM.

At the step P4, the control unit 10 performs the shift control by using the individual shift pattern stored in the IC card 1. If, however, no pattern is written in the IC card 1, the control unit 10 uses the basic pattern as initial data.

When an upshift or a downshift is actually carried out in accordance with the existing individual shift pattern, the driver can judge the timing of the shift to be too early, or too late, and feed his judgement back to the control system by operating the instruction switch 7. The instruction switch 7 is held at a neutral position if the driver considers the shift timing desirable. If the shift is not satisfactory to the driver, and the instruction switch 7 is operated, then the control unit 10 receives either the first evaluation signal Sear or the second evaluation signal Slat from the instruction switch 7.

At a step P5 following the step P4, the control unit 10 determines whether Sear is present or not. At a step P6, the control unit 10 determines whether Slat is present or not. If there exists the first evaluation signal Sear which indicates that the timing of the shift is too early, then the control unit 10 proceeds from the step P5 to a step P7 for performing a first modification (a). If there exists the second evaluation signal Slat indicating that the timing of the shift is too late, then the control unit 10 proceeds from the step P6 to a step P8 for performing a second modification (b). If neither Sear nor Slat is present, then the control unit 10 returns from the step P6 to the step P1. After the step P7 or P8, the control unit 10 proceeds to a step P9, and updates the contents (the individual shift pattern) of the IC card 1 by using the individual shift pattern modified at the step P7 or P8. In this example, the control unit 10 serves as the main processing means of the controlling means, and as the modifying means. The steps P1-P4 correspond to the main processing means, and the steps P5-P9 correspond to the modifying means.

The steps P7 and P8 are so designed as to vary the slope of the associated shift line and/or to move the associated shift line along the horizontal axis representing the vehicle speed SPD, of the shift pattern as shown in FIG. 2. The modifications (a) and (b) are performed on the basis of the learning algorithm of the perceptron, as follows:

In this embodiment, every shift line (1 to 2, 2 to 3, 3 to 4, 4 to 3, 3 to 2, and 2 to 1) is expressed by the following equation (1).

$$TVO = \alpha_{ij} SPD + \beta_{ij} \quad (1)$$

In this equation, i represents the speed before the shift (i=1, 2, 3 or 4), and j represents the speed after the shift (j=1, 2, 3 or 4). The quantity $\alpha_{ij}$ (alpha$_{ij}$) is the slope of the i-j shift line for the shift from the "ith" speed to the "jth" speed. The quantity $\beta_{ij}$ (beta$_{ij}$) represents the position of the i-j shift line along the vehicle speed axis of the shift pattern. The control system of this embodiment is arranged to adapt the individual shift pattern to the driver's taste by modifying $\alpha_{ij}$ and $\beta_{ij}$.

In this embodiment, the following equation (2) is used for expressing any one of the shift lines.

$$f = w_1 SPD + w_2 TVO \quad (2)$$

In this equation, f is a constant, $w_1$ is a first parameter given by $w_1 = -f\alpha_{ij}/\beta_{ij}$ and $w_2$ is a second parameter given by $w_2 = f/\beta_{ij}$. When, however, TVO is smaller than $\frac{1}{8}$ or greater than $\frac{7}{8}$, the following equations are used.

$$TVO < \frac{1}{8} \cdot SPD = \frac{f - \frac{W_2}{8}}{w_1}$$

$$TVO > \frac{7}{8} \cdot SPD = \frac{f - \frac{7W_2}{8}}{w_1}$$

The control system of this embodiment uses these equations, and changes values of the first parameter $w_1$ and the second parameter $w_2$ in response to the evaluation signals Sear and Slat.

If, for example. Sear is inputted against an upshift, then the control unit 10 changes at the step P7, the first and second parameters $w_1$ and $w_2$, as follows:

$$w_1 \leftarrow w_1 - C \cdot SPD \quad (3)$$

$$w_2 \leftarrow w_2 - C \cdot TVO \quad (4)$$

In these equation, C is a positive constant.

If Slat is inputted in opposition to the upshift, then the control unit 10 changes, at the step P8, the first and second parameters $w_1$ and $w_2$ as follows:

$$w_1 \leftarrow w_1 + C \cdot SPD \quad (3')$$

$$w_2 \leftarrow w_2 + C \cdot TVO \quad (4')$$

The positive constant C appearing in the equations (3), (4), (3') and (4') is a factor closely related to the convergence of learning. Therefore, it is desirable to choose an appropriate value of the constant value C experimentally.

If Sear is inputted immediately after a downshift, then the control unit 10 changes, at the step P7, the first and second parameters $W_1$ and $w_2$ by using the equations (3') and (4'). If Slat is inputted immediately after the downshift, then the control unit 10 changes, at the step P8, the first and second parameters $w_1$ and $w_2$ by using the equations (3) and (4).

When, therefore, the evaluation signal Sear or Slat is inputted, then the control unit 10 modifies the first and second parameter $w_1$ and $w_2$ of the shift line which has been used for the most recently performed shift, by using values of SPD and TVO existing at the instant of the shift. The control unit 10 temporarily stores, in a predetermined area of the RAM, the values of the vehicle speed SPD and the throttle opening TVO obtained at the instant of the shift, and uses the stored values of SPD and TVO in calculating the new values of $w_1$ and $w_2$.

In this way, the shift control system of this embodiment permits the driver to judge during actual driving whether the timing of a shift is proper or not, and modifies the shift lines causative of the deprecated shifts. The process of a driver's complaint and a corresponding modification is repeated until the individual shift pattern is completely fitted to the driver.

Figure 4:
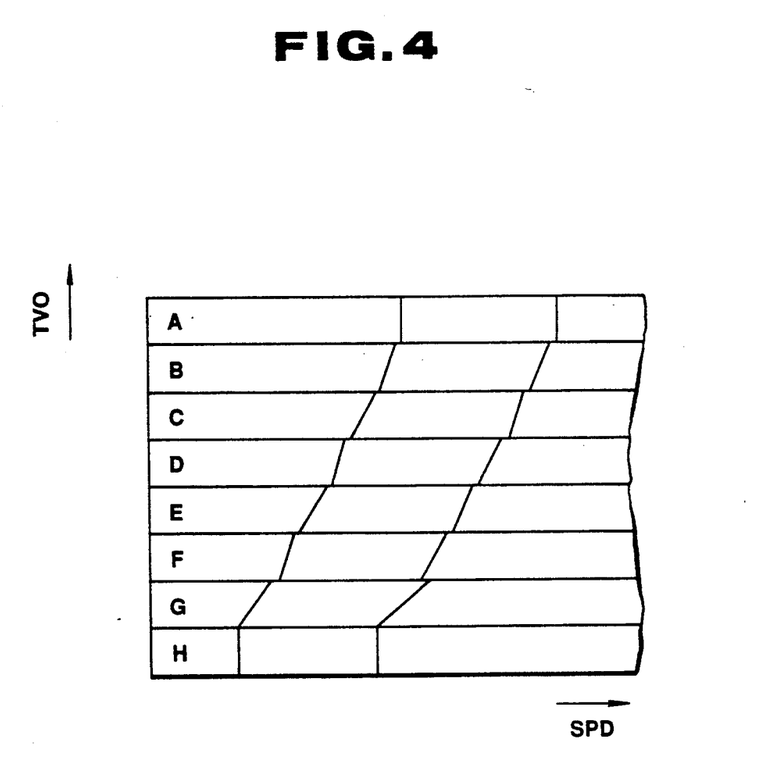
FIG. 4 is a diagram showing shift lines which can be employed in the present invention.

In this embodiment, each shift line in the range $\frac{1}{8} \leq TVO \leq \frac{7}{8}$ is in the form of a single continuous straight line segment expressed by a single linear equation. However, it is possible, and preferable in some cases, to employ shift lines as shown in FIG. 4. In the example shown in FIG. 4, the entire range of the throttle opening TVO from 0/8 to 8/8 is divided into eight intervals (A, B, ... H) of an equal length (one eighth of the entire range of TVO), and each shift line is composed of eight straight line segments each extending only in a unique one of the eight intervals from its lower limit horizontal line to its upper limit horizontal line as shown in FIG. 4. Therefore, each shift line is expressed by eight distinct linear equations. In this case, one or more discontinuities appear in one or more shift lines. However, the shift lines are made more and more continuous by the repetition of the modification process.

What is claimed is:

1. A shift control system for an automatic transmission of a vehicle, comprising:
   actuator means for changing a speed ratio of said automatic transmission in response to a shift control signal,
   sensor means for sensing an operating condition of said vehicle, and producing a sensor signal,
   controller means, connected with said sensor means, for producing said shift control signal to control said automatic transmission in accordance with a single predetermined adaptable shift pattern, input means which permits a driver of said vehicle to evaluate a shift effected by said controller means, and to produce an evaluation signal, and modifying means for altering said single shift pattern in accordance with said evaluation signal.

2. A shift control system according to claim 1 wherein said sensor means comprises a vehicle speed sensor for sensing a vehicle speed of said vehicle, and an engine load sensor for sensing an engine load of an engine of said vehicle, and said controller means determines said speed ratio of said automatic transmission in accordance with said vehicle speed and said engine load by using said shift pattern.

3. A shift control system according to claim 2 wherein said engine load sensor is a throttle opening sensor for sensing a throttle opening of said engine, and said controller means treats said throttle opening as said engine load.

4. A shift control system according to claim 1 wherein said controlling means comprises first storage means for storing data defining a shift line of said shift pattern, and said modifying means includes means for changing the data which defines the shift line and which is stored in said first storage device.

5. A shift control system according to claim 4 wherein said input means includes means for producing one of a first evaluation signal representing a driver's evaluation that a shift is too early, and a second evaluation signal representing a driver's evaluation that a shift is too late.

6. A shift control system according to claim 4 wherein said controller means further comprises second storage means for temporarily storing a magnitude of said sensor signal produced by said sensor means, and said modifying means is connected with said second storage means, and includes means for changing the data defining the shift line by using the value stored in said second storage means in dependence on said evaluation signal.

7. A shift control system according to claim 4 wherein said system further comprises a manually operable mode selector for producing a normal mode signal and an individual mode signal, and said controlling means further comprises read-only storage means for storing a basic shift pattern, and a main processing means for producing said control signal in accordance with said basic shift pattern when said normal mode signal is present, and in accordance with said adaptable shift pattern when said individual mode signal is present.

8. A shift control system for an automatic transmission of a vehicle, comprising:
  actuator means for changing a speed ratio of said automatic transmission in response to a shift control signal,
  sensor means for sensing an operating condition of said vehicle, and producing a sensor signal,
  controller means, connected with said sensor means, for producing said shift control signal to control said automatic transmission in accordance with a predetermined adaptable shift pattern,
  input means which permits a driver of said vehicle to evaluate a shift effected by said controller means, and to produce an evaluation signal,
  modifying means for altering said shift pattern in accordance with said evaluation signal, and
  wherein said controller means comprises first storage means for storing a shift line of said shift pattern in the form of a linear equation including a first term equal to said vehicle speed multiplied by a first parameter and a second term equal to said throttle opening multiplied by a second parameter, and said modifying means changes a value of at least one of said first and second parameters in response to said evaluation signal.

9. A shift control system according to claim 8 wherein said modifying means is connected with said first storage means, and replaces a current value of said first parameter stored in said first storage means by a new value which is equal to a sum of said current value of said first parameter and a product obtained by multiplying said vehicle speed by a predetermined constant in response to said evaluation signal.

10. A shift control system according to claim 9 wherein said modifying means replaces a current value of said second parameter stored in said first storage means by a new value of said second parameter which is equal to a sum of said current value of said second parameter and a product obtained by multiplying said throttle opening by said predetermined constant in response to said evaluation signal.

11. A shift control system according to claim 10 wherein said controller means further comprises second storage means for temporarily storing values of said vehicle speed and said throttle opening, and wherein said modifying means is connected with said second storage means and uses said values of said vehicle speed and said throttle opening stored in said second storage means in calculating said new values of said first and second parameters.

12. A shift control system according to claim 11 wherein said input means has a first position for producing a first evaluation signal, a second position for producing a second evaluation signal, and a third position for producing a third evaluation signal, and wherein said modifying means changes said first and second parameters by using said constant which is negative when said first evaluation signal is produced, and changes said first and second parameters by using said constant which is positive when said second evaluation signal is produced, and said modifying means holds said first and second parameters unchanged when said third evaluation signal is produced.

13. A shift control system according to claim 12 wherein said first storage means comprises a portable memory card for storing said adaptable shift pattern, and an onboard device, connected with said modifying means, for writing and reading data to and from said memory card.

14. A shift control system according to claim 13 wherein said controller means further comprises a third storage means for storing a basic shift pattern, and a mode selector which is adapted to be operated by the driver of said vehicle, and which has a first position for producing a normal mode signal and a second position for producing an individual mode signal, and wherein said controller means produces said control signal in accordance with said basic shift pattern when said normal mode signal is present, and in accordance with said adaptable shift pattern when said individual mode signal is present.

15. A shift control system according to claim 14 wherein said adaptable shift pattern includes a plurality of shift lines each of which is approximated by a plurality of linear equations each of which is defined uniquely in one of intervals into which an entire range of said throttle opening is divided, and wherein said first storage means comprises memory locations for storing said linear equations of each shift line, and said modifying means is capable of modifying each of said modifying equations of each shift line.

16. A shift control system for an automatic transmission of a vehicle, comprising:

actuator means for changing a speed ratio of said automatic transmission in response to a shift control signal, sensor means for sensing an operating condition of said vehicle, and producing a sensor signal, controller means, connected with said sensor means, for producing said shift control signal to control said automatic transmission in accordance with a predetermined adaptable shift pattern, input means which permits a driver of said vehicle to evaluate a shift effected by said controller means, and to produce an evaluation signal, modifying means for altering said shift pattern in accordance with said evaluation signal, and wherein said controlling means comprises first storage means for storing data defining a shift line of said shift pattern, and said modifying means includes means for changing the data which defines the shift line and which is stored in said first storage device.

* * * * *